Figure 1:
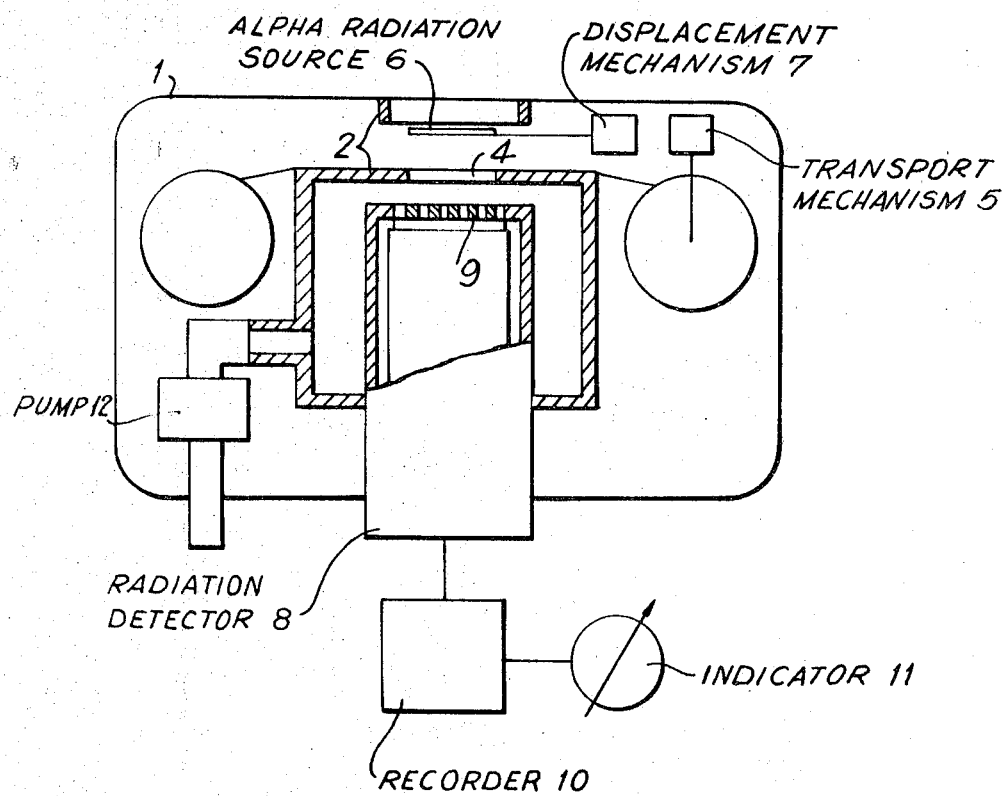

United States Patent

[11] 3,558,884

| [72] | Inventors | Valentin Grigorievich Babich<br>Leningradskoe shosse, 54, kv. 253;<br>Alexander Kuzmich Kursky, 1<br>Krasnoselsky per.,5,kv.7; Konstantin<br>Petrovich Markov, 3 Baltiisky<br>per,4,korp.1,kv.8; Nikoali Vasilievich<br>Ryabov, 2 Pavlovsky per.,10a,kv.10;<br>Konstantin Nikolaevich Stas, 4 ul.<br>Oktyabrskogo polya,1,kv.20, Moscow,<br>U.S.S.R. |
|---|---|---|
| [21] | Appl. No. | 696,421 |
| [22] | Filed | Jan. 8, 1968 |
| [45] | Patented | Jan. 26, 1971 |

[54] INSTRUMENT FOR DETERMINING THE WEIGHT AND ACTIVE CONCENTRATION OF AEROSOLS
3 Claims, 2 Drawing Figs.

[52] U.S. Cl. .................................................. 250/43.5, 250/83.3
[51] Int. Cl. ................................................ G01n 23/06
[50] Field of Search .......................................... 250/43.5D, 44, 43.5R, 83.6(FT), 83.3D, 106T

[56] References Cited
UNITED STATES PATENTS

| 2,660,678 | 11/1953 | Sigworth et al. | 250/106X |
| 2,951,161 | 8/1960 | Foster et al. | 250/83.3X |
| 2,972,678 | 2/1961 | Anton | 250/43.5 |
| 3,029,344 | 4/1962 | Long et al. | 250/83.6 |
| 3,373,286 | 3/1968 | Han | 250/83.3X |

*Primary Examiner*—Ralph G. Nilson
*Assistant Examiner*—Davis L. Willis
*Attorney*—Waters, Roditi and Schwartz ABSTRACT: An instrument for monitoring industrial atmospheres for determining the weight and active concentration of aerosols, in which the weight of the dust precipitate collected on a filter is determined by the rate of absorption of the radiation of an external alpha particle radioactive source, and the active concentration of the aerosol is determined by measuring the background radiation of the sample. The radiation source and the detector are disposed directly in a gas conduit on both sides of the filter element, on which the aerosol samples are being collected. In order to measure the background radiation of the sample, the radioactive source can be withdrawn from the gas conduit. The instrument is furnished with a collimator in order to reduce the influence of the background activity of the sample on the measurements of the dust concentration.

INSTRUMENT FOR DETERMINING THE WEIGHT AND ACTIVE CONCENTRATION OF AEROSOLS

This invention relates to instruments for monitoring industrial atmospheres and, more particularly, it relates to instruments for determining the weight of dust and the amount of radioactivity per unit volume of the gas being monitored.

Known are devices for measuring the weight and active concentration of aerosols, wherein aerosol sampling is effected by drawing a test gas through a filter element, followed by determining the thickness of the dust precipitate thus obtained, the dust precipitate thickness being evaluated by measuring the absorption of beta rays emitted by a radioactive source. In the known devices, dust sampling is carried out in a gas inlet conduit, while measurements of the dust precipitate thickness is effected at a distance from the gas inlet conduit which carries said radioactive source and a radiation detector disposed at different sides of the filter element. In the beta source, provision is made for a shield, which makes it possible to measure the background radiation of the dust sample being examined.

The known devices suffer from a number of limitations, such as significant duration of measurements due to the necessity of accumulating a substantial amount of dust on the filter element; elaborate design of the radiation detector and also of the radiation intensity recorder necessitated by the fact that recourse is had to low-energy beta rays in order to obtain pronounced absorption of the radiation where the dust precipitate collected on the filter element is minute; failure to account for variations in the thickness of the filter element, and indiscriminate recording of dust particles irrespective of the particle size, although particles under 10 $\mu$ in diameter present maximum health hazard. Moreover, the known devices are usually cumbersome and difficult to operate, particularly under underground mining conditions, while attempts to make the devices compact and light in weight result in a decreased sensitivity of measurements (ca. 5 mg./m.3).

It is an object of the present invention to provide an instrument for measuring the weight and active concentration of aerosols which has high sensitivity and precision.

It is another object of the present invention to provide an instrument for measuring the weight and active concentration of aerosols that has enhanced sensitivity to dust particles below 10 $\mu$ in diameter which present a maximum silicosis hazard.

It is a further object of the present invention to provide an instrument for measuring the weight and active concentration of aerosols which is reliable and convenient in operation in underground mining conditions and is readily portable.

In accordance with these and other objects, in the present instrument for measuring the weight and active concentration of aerosols a radioactive source and a radiation detector are disposed in a gas intaking conduit, the radioactive source being placed upstream with reference to a filter element and furnished with a mechanism for bringing the source out of the conduit during aerosol sampling.

An alpha emitter may be used to advantage as the radioactive source.

It is expedient to furnish the radiation detector with a collimator capable of absorbing partially the background radiation of the aerosol sample, the collimator comprising an alpha particle absorbing plate with apertures.

Thanks to the above-specified design features, the present instrument exhibits high sensitivity and precision, makes for dependable performance and operational convenience in underground mining conditions, and is readily portable.

Figure 2:
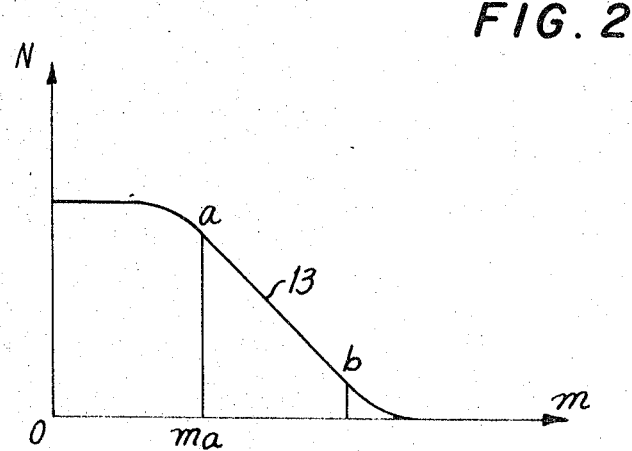

Other objects and advantages of the present invention will become apparent from a consideration of the description of an exemplary embodiment thereof and from accompanying drawings, wherein:

FIG. 1 is a diagrammatic illustration, partly in section of the present instrument; and FIG. 2 is a characteristic alpha absorption curve of the instrument.

The instrument, according to the invention, comprises a casing 1 (FIG. 1), which accommodates a gas inlet conduit 2 with a port 3 closed by a protective screen (not shown in the drawing), which screen supports a filter element 4 made in the form of a tape wound onto spools; a transport mechanism 5 for filter element 4; an alpha radiation source 6; a mechanism 7 that withdraws source 6 out of gas inlet conduit 2; a radiation detector 8 with a collimator 9 disposed in gas inlet conduit 2 immediately above filter element 4; a radiation intensity recorder 10; an indicating instrument 11, and an arrangement 12 for pumping the gas being examined through filter element 4 in conduit 2. Collimator 9 consists of an alpha particle absorbing plate with apertures.

The present instrument functions in the following manner.

Onto the protective screen is placed fresh filter element 4, by means of mechanism 5, and radioactive source 6 is brought into gas inlet conduit 2. A part of the alpha particles from source 6 reaches detector 8, the intensity of radiation being measured through the agency of the electronic circuit of recorder 10 and indicating instrument 11. Then mechanism 7 is actuated to withdraw radioactive source 6 from gas inlet conduit 2, and the test gas is drawn by means of arrangement 12 through filter element 4 to effect aerosol sampling. Aerosol sampling having been completed, radioactive source 6 is brought into conduit 2, followed by measuring for the second time the intensity of radiation that reaches detector 8 this time by passage through filter element 4 having a dust precipitate deposited thereon. The difference between the two radiation intensity readings due to an increase in the thickness of filter element 4 caused by dust deposition corresponds to the weight concentration of the aerosol under examination.

It is pertinent to employ a high intensity radiation source in order to eliminate an additional error that might appear in the results of measuring the amount of dust collected on filter element 4, said additional error being caused by the background alpha activity of the dust sample obtained. However, an excessively high activity of the alpha source used would necessitate the employment of a high time resolution electronic circuit of recorder 10 in order to record the pulses fed by detector 8 and, hence, would make the instrument recording arrangement excessively complicated. To avoid this limitation, the present instrument incorporates, as pointed out earlier, collimator 8 interposed ahead of detector 8 and comprising an alpha particle absorbing plate with apertures. Thanks to the collimator, the count rate of detector 8 is decreased by a factor of 10, so that, with the activity of source 6 increased accordingly, the amount of radiation that falls on detector 8 upon passage through the dust deposit being examined remains unaltered, whereas the number of alpha particles resulting from the decay of radioactive isotopes present in the dust sample and reaching detector 8 would experience a 10-fold attenuation.

To measure the active concentration of aerosols, recourse is had to determining the radioactivity of the sample collected on the filtered, alpha particle source 6 being out of gas inlet conduit 2 for the duration of measurements.

In view of the fact that alpha radiation has the lowest penetration power, the employment of an alpha emitter as the radioactive source is conducive to recording minute changes in the thickness of filter element 4 and, therefore, renders it possible to attain high sensitivity of the present instrument despite the use of compact arrangements 12 for pumping the test gas through the filter element and of a simple electronic circuit in recorder 10. Moreover, the direct relationship between the weight of the dust deposit and the difference of the above-identified radiation intensity measurements will be observed only within a certain aerosol particle range, the maximum size of aerosol particles in said range being dependent upon the total thickness of absorbers interposed between radioactive source 6 and radiation detector 8, as well as upon the range of alpha particles emitted by the isotope used in source 6. Where a dust deposit density of, say, 1 mg./cm.2 is adequate for complete absorption of the energy of an alpha particle, the alpha particle energy being also attenuated thanks to the passage through an air layer, filter element 4 proper and the protective coating of detector 8, an increase in the size of aerosol particles beyond 10 $\mu$, provided the aerosol material density equals 1 g./cm.3, does not result in a decrease of the intensity of alpha particles falling on detector 8 that would be proportional to the mass of a dust particle, i.e. to the third power of the linear dimensions of the particle in question, as in this case the absorption power would be governed by the area of the dust particle that screens detector 8 and, hence, would be proportional to the second power of the linear dimensions of the dust particle in question. The share of dust particles having a diameter of, say, 1,000 $\mu$ in radiation intensity attenuation would, therefore, be 100 times smaller than the weight of the particles of this size, while the dust particles under 10 $\mu$ in diameter would result in attenuating the radiation intensity proportionally to the weight of the particles in question. The employment of an alpha emitter is, therefore, conducive to recording selectively the dust fraction that presents maximum health hazards.

The performance of the present instrument is illustrated by alpha particle absorption curve 13 (FIG. 2), wherein plotted on the abscissa is the dust deposit thickness (mg./cm.2), and on the ordinate, the intensity of radiation, N, recorded by detector 8 and expressed in pulses per second. As can be seen from the graph, the instrument performance is most effective in case the readings are taken along the linear portion a–b of absorption curve 13. The length of the linear portion a–b is governed by the ratio of the linear dimensions of source 6 and those of radiation detector 8, provided source 6 is smaller than detector 8. An adequate length of the portion a–b is attained where the diameter of detector 8 is at least 1.5 times greater than the diameter of source 6, another condition being that the thickness of filter element 4 and that of the window of detector 8 as well as the distance between source 6 and detector 8 should be selected so that the sum total of these absorbing media would be greater than the value ma which marks the initial point a of the linear portion ab of curve 13.

Thanks to the fact that source 6, filter element 4 and detector 8 are disposed in relation to one another in the manner disclosed hereinabove, it is feasible to account for variations in the thickness of filter element 4 by measuring the radiation intensity twice, viz., before and after drawing the test gas through the filter element.

The employment of the present instrument makes it possible to measure dust concentrations of the order of 1 mg./m.3 within 10 minutes. The present instrument seems most promising for use in conjunction with underground mining operations when it is pertinent to measure, apart from the concentration of dust, also the content of aerosols of alpha ray isotopes, e.g., short-lived products of radon decay.

Although the present invention has been described with reference to a preferred embodiment thereof, various changes and modifications can be practiced without deviating from the spirit and scope of the invention as those skilled in the art will readily understand.

We claim:

1. An instrument for determining the weight and active concentration of aerosols, which comprises a casing; means defining a gas conduit in said casing for sampling said aerosols; means for pumping a stream of test gas through said conduit; a filter element positioned in the conduit for the passage therethrough of the stream of test gas to collect aerosol samples; a radioactive source of alpha radiation disposed in said conduit upstream with reference to said filter element; an alpha particle radiation detector disposed in said casing on the side of said filter element opposite said radiation source; means for withdrawing said radioactive source from said gas conduit; and means for recording the intensity of alpha radiation that falls on said detector.

2. An instrument according to claim 1 wherein said alpha radiation detector comprises a collimator constituted as an alpha particle absorbing plate with apertures whose axes are perpendicular to the surface of said detector.

3. An instrument according to claim 1 wherein said detector and filter element are in axial alignment, and said radiation source is coaxial therewith when operatively positioned in said conduit.